United States Patent

Head et al.

[11] 3,897,943
[45] Aug. 5, 1975

[54] TIRE BREAKER BELT STOCK

[75] Inventors: William J. Head, Rollingen; Georges Goedert, Gilsdorf, both of Luxemburg

[73] Assignee: The Goodyear Tire & Rubber Company, Akron, Ohio

[22] Filed: Dec. 5, 1973

[21] Appl. No.: 421,898

[52] U.S. Cl. .................................. 270/86; 270/93
[51] Int. Cl.² .................................. B65H 45/22
[58] Field of Search .......... 270/66, 86, 93–94; 156/202, 204, 226, 227, 132, 443, 447, 459, 460, 461, 463, 465, 468, 469, 481–482; 223/28–29, 34–37; 93/84 R; 152/361, 362; 425/36

[56] References Cited
UNITED STATES PATENTS
1,723,565  8/1929  Little .................. 156/132

FOREIGN PATENTS OR APPLICATIONS
481,155  2/1952  Canada ................ 156/132

Primary Examiner—Robert W. Michell
Assistant Examiner—A. Heinz
Attorney, Agent, or Firm—F. W. Brunner; R. S. Washburn

[57] ABSTRACT

Method and apparatus for folding tire breaker belt stock, particularly stock having reinforcement extending at acute angles with respect to a running length thereof. The stock travels on and with a rigid surface as of a cylinder, the edge of which parallels closely the desired fold line. A lateral portion of the belt to be folded overhangs the edge and is progressively turned about the fold line through decreasing angles relative to the surface to complete folding of the stock.

The foregoing abstract is not to be taken as limiting the invention of this application, and in order to understand the full nature and extent of the technical disclosure of this application, reference must be made to the accompanying drawing and the following detailed description.

10 Claims, 9 Drawing Figures

PATENTED AUG 5 1975

3,897,943

SHEET 1

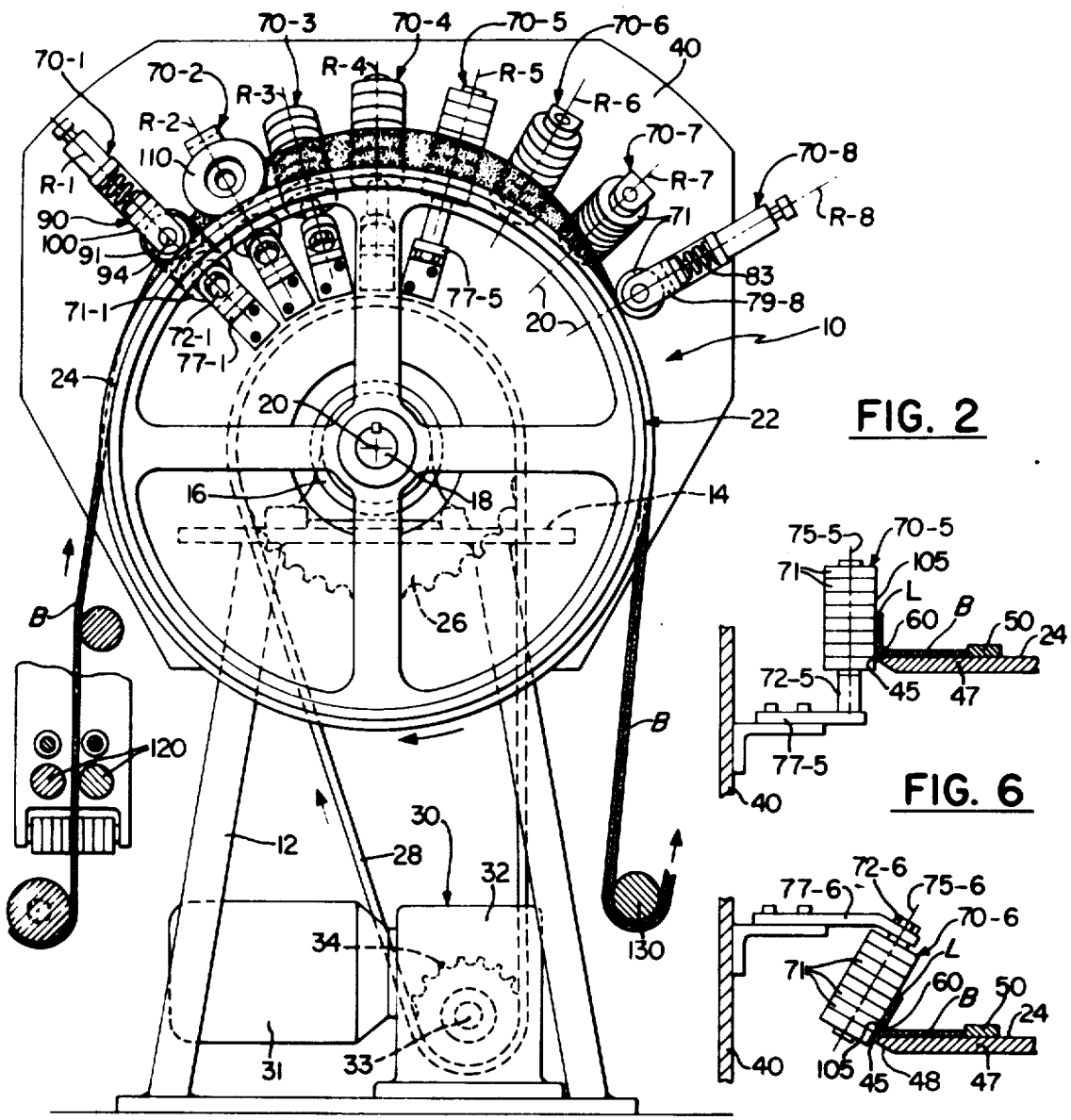
FIG. 2
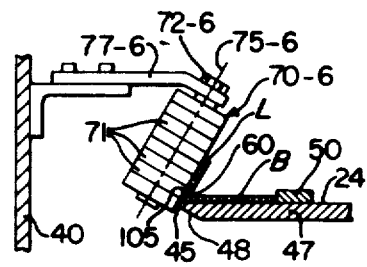
FIG. 6
FIG. 7
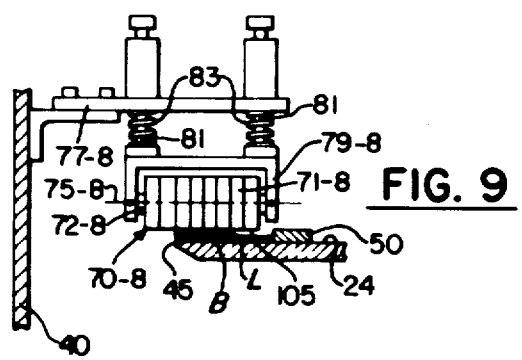
FIG. 9
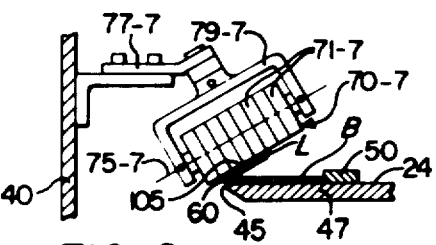
FIG. 8

TIRE BREAKER BELT STOCK

The present invention relates to the manufacture of tires and particularly to the folding of a running length of tire building stock along a line parallel to such running length. Still more particularly, the invention relates to method and apparatus for folding a breaker belt stock.

A primary object of the invention is to provide for folding tire making stock, particularly breaker belt stock more economically and more accurately than heretofore.

To acquaint persons skilled in the art with the principles of the invention, certain preferred embodiments illustrative of the best mode presently contemplated for practicing the invention will be described in connection with the attached drawings, it being understood that the described embodiments are illustrative only and are not to be taken as limiting the scope of the invention as defined in the appended claims.

In the drawings:

FIG. 2 is an elevation of the apparatus of FIG. 1 taken as indicated by the line 2—2 in FIG. 1; FIGS. 3 through 9 are partial views each illustrating successive working stations in the apparatus of FIG. 1.

Figure 1:
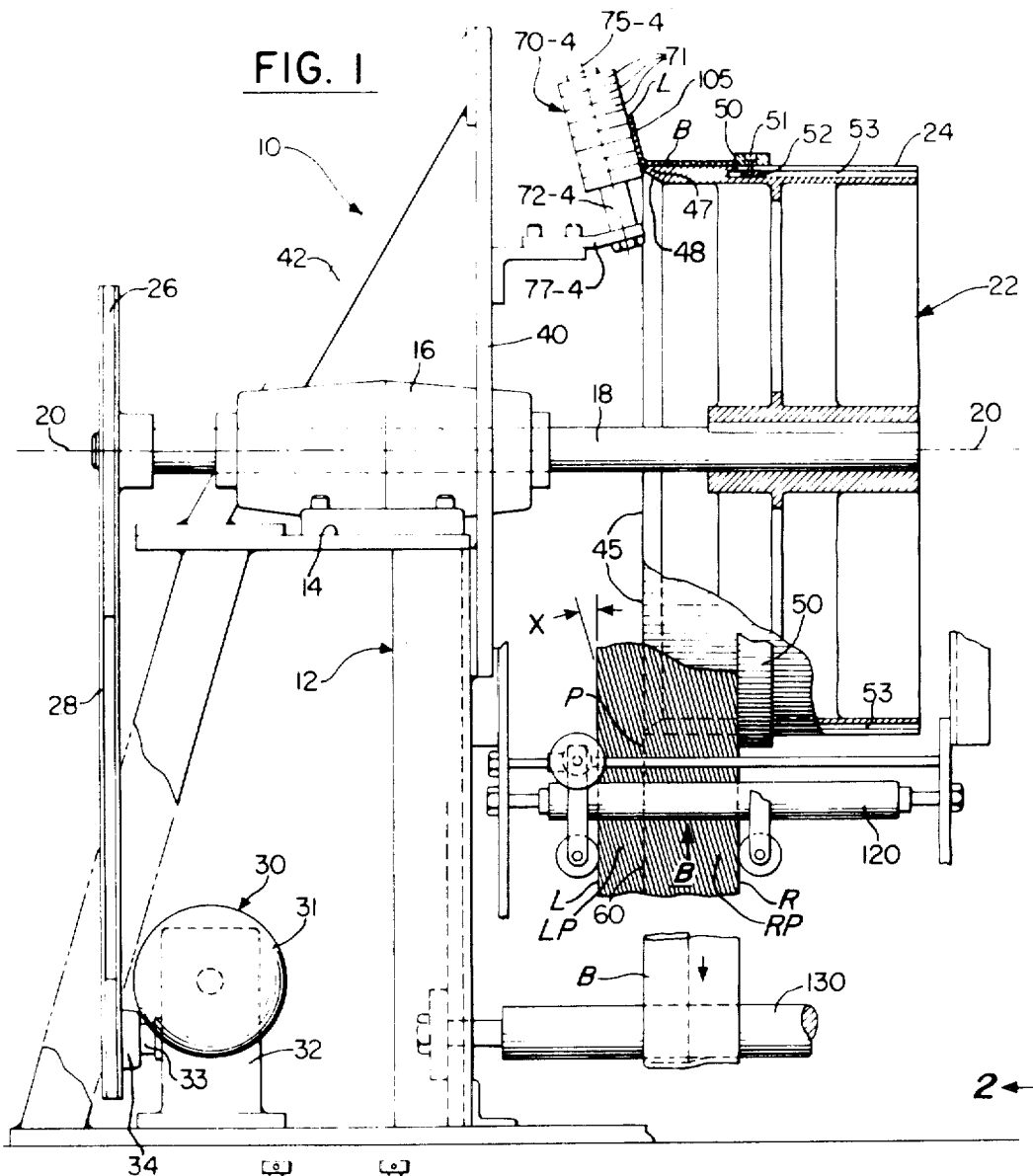
FIG. 1 is a schematic view in elevation of an apparatus in accordance with the invention.

Referring to the attached drawings and particularly to FIGS. 1 and 2, an apparatus 10 in accordance with the invention comprises a frame 12, including a pedestal 14, supporting a bearing 16 in which an elongate shaft 18 is supported for rotation about horizontal axis 20.

A drum 22 having a right circular cylindrical surface 24 is mounted corotatably on the forward end portion of the shaft 18. A sprocket 26 is fixed corotatably on the rearward end portion of the shaft 18 and is connected by an endless drive chain 28 to a driving assembly 30 including a motor 31, a gear reducer 32, and a drive shaft 33 corotatably carrying a sprocket 34 which engages the chain 28.

The frame 12 includes a mounting plate 40 extending upwardly and arcuately about the shaft 18 and maintained in vertical orientation by the struts 42 extending obliquely between the pedestal 14 and the mounting plate 40.

The cylindrical surface 24 of the drum 22 terminates at its axially inward edge 45 at a plane P normal to the rotational axis 20 of the shaft and drum, the cylindrical wall 47 of the drum being tapered or otherwise relieved internally as at 48 to form a relatively narrow annulus 49 at the edge of the drum in the plane P.

An adjustable guide ring 50 is fitted nearly and concentrically on the cylindrical surface 24 of the drum 22 and is there secured to common cap screws 51 which cooperate with common square nuts 52 which are each slidable in the respectively associated T-slots 53 formed in the drum wall 47 and extending parallel to the axis 20 of the drum.

As will be explained in greater detail hereinbelow, a belt is folded along a fold line 60 extending parallel to and between the respective lateral edges L and R of the belt B, as the belt is carried by the cylindrical surface 24. To accomplish the folding of the belt progressively, a series of turning devices 70 (and identified individually as 70-1, 70-2, . . . 70-8, inclusive) are disposed at arcuate intervals about the drum 22 to cooperate with the aforesaid edge 45.

The turning devices 70 each individually comprise a plurality of narrow rollers 71 assembled for rotation about a common axis. The narrow rollers are common ball or roller bearings which are coaxially juxtaposed on a shaft 72 provided by a common bolt, the axis 75 of which is coplanar with and intersects the rotation axis 20 of the drum.

Each outer member of each roller 71 is free to turn at its own speed, independently of the adjacent rollers 71. Since in being turned outwardly, the belt edge portion travels an arc of different radius than the radius of the drum 22 or of other rollers 71, the plurality of rollers 71 tends less to distort the edge being folded than would an integral roller, or a fixed shoe guide.

Figures 3, 4, 5:
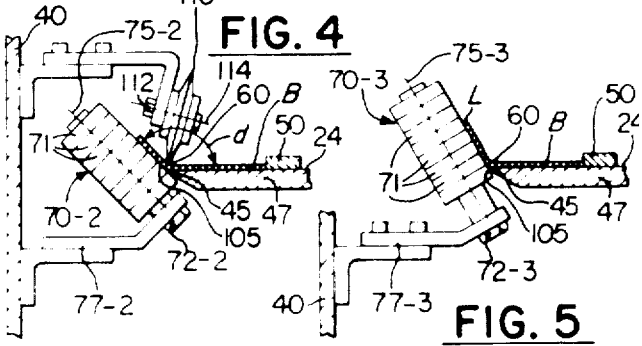

Referring additionally to FIGS. 3 through 9, the successive stations, 1 through 8, in which the respective turning devices 70 are located are given suffix numerals corresponding to the numbers of the respective stations for convenience in description, as are like component elements located in the respective stations. FIG. 3 illustrates the arrangement of the turning device 70-1 at station 1 wherein the axis 75-1 of the turning device 70-1 is disposed at or about 30° with the axis 20 of the drum, the shaft 72-1 of the turning device 70-1 being secured by a suitable bracket 77-1 to the mounting plate 40.

In station 2, illustrated in FIG. 4, the axis 75-2 of the turning device 70-2 is disposed to make a larger angle with respect to the drum axis 20, being an angle of approximately 45°. The bolt or shaft 72-2 is secured by a suitable bracket 77-2 fixed on the surface of the mounting plate 40. The arcuate spacing between the radial planes R-1, R-2 containing stations 1 and 2, respectively, is approximately 15° about the axis 20. Station 3, illustrated in FIG. 5, has a third turning device 70-3, the rotation axis 75-3 of which makes an angle of about 60° with the drum axis 20 and its locating plane R-3 is spaced arcuately about 15° from the plane R-2 of station No. 2, the multiple rollers 71 of the turning device 70-3 being mounted on a bolt or shaft 72-3 secured in a bracket 77-3 fixed on the plate 40.

Station 4 (shown in FIGS. 1 and 2) is spaced arcuately about 15° from station 2, its turning device axis 75-4 making an angle of about 75° with the axis of the drum while station 5 (seen in FIG. 6) is spaced another 15° from station 4, its axis 75-5 making an angle of about 90° with the drum axis 20, each of the turning devices having theeir respective shafts secured to suitable brackets 77-4 and 77-5 mounted on the plate 40.

The turning device 70-6 of FIG. 7 is rotatable about an axis 75-6 coplanar with the drum axis 20 and making an angle of 120° therewith and is mounted in a similar manner on a suitable bracket 77-6 fixed on the plate 40. The turning device 70-7 at station No. 7 (FIG. 8) is rotatable about an axis 75-7 coplanar with the drum axis 20 and making an angle of 150° therewith. For convenience, the turning device 70-7 of station 7 is provided with a yoke 79-7 which supports the bolt forming the shaft 72-7 of the plurality of rollers 71 thereof and which yoke is fixed to the mounting plate by a suitable bracket 77-7. In station 8, (FIG. 9), the turning device 70-8 has its multiple rollers 71 mounted on a shaft 72-8 provided by a bolt attached in the arms of a yoke 79-8 carried by a suitable bracket 77-8 fixed on the mounting plate 40. In station 8, the yoke 79-8 is resiliently mounted to the bracket 77-8 by a parallel pair of studs 81 each of which is provided with a compression spring 83 by which the yoke 79-8 and the turning device 70-8 is resiliently urged toward the cylindrical surface 24 of the drum 22. The rotation axis 75-8 of the turning device 70-8 in station 8 is disposed parallel to, that is, at 180° with the drum axis 20 and coplanar therewith.

As will now be apparent, the orientations of the respective axes 75-1 through 75-8 may as well be referred to the surface 24 of the drum 22 and the stock thereon. Thus, each respective axis, e.g. 75-2, can be said to make a lesser angle with the surface 24 than does the axis 75-1. Each succeeding folding device 70 and its axis 75 is oriented at a lesser angle with the surface 24 than is the preceding device and its axis, so that the belt, flat at the time of application to the surface 24, and including an angle of 180° about the fold line 60, is progressively turned to a folded or doubled condition making an angle of 0° with its vertex at the fold line 60. As will be understood by persons acquainted with the most relevant arts, the two portions of the folded breaker bolt are in substantially immediate face-to-face contact with each other for the full width, and length, of at least the narrower of the two portions.

Referring again to station 1 as seen in FIG. 3, a belt hold-down device 90 comprising a plurality of narrow rollers 91, is similarly provided by a plurality of common ball or roller bearings mounted coaxially on a shaft 93 provided by a through bolt 94 and serves to hold the belt material B to be folded in intimate contact with the cylindrical surface 24 of the drum 22. The bolt 94 is secured in the arms 96,98 of a yoke 100 which is mounted by a suitable bracket 102 fixed on the mounting plate 40 at or near station 1. The springs 103 carried by each of two studs 104 serve to urge the hold-down device 90 resiliently toward the surface 24 of the drum with the belt B therebetween.

As will be apparent from FIGS. 3 through 9, the cylindrical surfaces 105 of the turning devices 70 are each placed near to the edge 45 of the drum so as to cooperate therewith in folding the belt B progressively about its fold line 60 as the belt is being moved by the drum 22 so that the fold line 60 is held closely parallel to the edge.

In station 2, best seen in FIG. 4, a fulcrum wheel 110 is mounted rotatably on a shaft 112 which provides an axis 114 oriented so that the plane of rotation of the wheel 110 divides the angle d of fold of the belt accomplished by the associated turning device 70. The single fulcrum wheel 110 illustrated has been found satisfactory in the operation of the apparatus 10 being described, but additional fulcrum wheels may be provided and located as desired to prevent stiffer belt materials from being displaced from the cylindrical surface 24 of the drum.

The previously mentioned guide ring 50, being adjustably located axially of the cylindrical surface 24 of the drum, provides a guide and stop to prevent displacement of the belt away from the folding devices 70 axially of the drum surface during the folding operation.

The breaker-belt stock employed in the practice of the invention comprises a running length of wire or cord fabric in which the wires or cords extend in mutually parallel coplanar array. The cords or wires are disposed transverse to the running length at a predetermined bias angle with respect to the parallel edges of such running length. Such stock is prepared, as is customary in the tire making arts, by calendering an uncured, curable rubber, or rubber-like compound on a fabric of warp cords or wires. The fabric may or may not have weft threads. After calendering, the cord or wire fabric is bias cut, the successive pieces thus cut are then each turned so that the freshly cut edges form the lengthwise edges of the now bias cut stock and the respective uncut edges of the fabric as calendered are spliced one to another to form an indefinite running length of bias-cut breaker-belt or ply stock. The preparation of such stock does not fall within the scope of the present invention. Other methods or apparatus for preparing the stock described can be equally suitable.

In operation, the apparatus 10 is particularly adapted to folding pneumatic tire breaker belt stock. Such breaker belt stock is provided in roll form to a supply or let-off arrangement (not shown). From the let-off the stock to be folded is trained through a conventional stock guide means 120 in controlled lateral alignment with the cylindrical or running surface 24 of the drum and so located as to position the desired fold line 60 at or very close to the edge 45 and plane P of the drum. A first portion RP of the stock extending laterally between the fold line 60 and the right hand (in FIG. 1) edge R is progressively engaged in non-slip contact with the moving surface 24. The edge R of the strip stock is disposed adjacent to and guided by the guide ring 50 previously described. Rotation of the drum 22, effected by the drive assembly 30, receives the breaker belt stock from the mentioned let-off, through the guide means 120 in intimate and relatively non-slipping contact with the cylindrical surface 24 of the drum. The lateral portion LP of the stock which extends laterally between the fold line 60 and the left hand (in FIG. 1) edge L, also referred to as the remaining or overhanging edge, overhangs the edge 45 of the drum toward the mounting plate 40 (as seen in FIG. 1) and is progressively engaged and turned by the successive turning devices 70 each of which moves the overhanging edge portion LP angularly about the fold line 60. The running length of breaker belt stock is folded progressively in its passage through the successive stations 1 through 8, its folding being completed in the final station 8 illustrated in FIG. 9. The two portions RP and LP are pressed together in intimate face-to-face contact extending outwardly from the fold line 60 by the device 70-8 in station 8. The folded belt B is then conducted by conventional means from the surface of the drum about a turning roll 130 to a conventional wind-up (not shown) by which the now folded belt B is wound into a roll for use in the manufacture of tires.

While the apparatus described above is the preferred means of accomplishing the folding of a breaker belt or similar tire making stock, the process aspects of the apparatus can be accomplished by providing between a conventional stock let-off and a conventional stock wind-up a bight or reach of such stock extending therebetween, and by disposing said bight or reach of breaker stock in surface contact with a movable, convexly curved, rigid surface having an edge disposed parallel to the direction of movement of said surface and at or close to the desired fold line extending longitudinally of said stock, and moving said stock and said surface together along a path parallel to the fold line. During the moving of the stock and the surface together, the overhanging edge or laterally extending portion of the stock is moved into engagement with successive turning devices disposed at intervals spaced along said path such that the turning devices move such overhanging edge portion of the stock to successively lesser angles with respect to the stock in contact with the surface, such angles having their vertices, respectively, in the fold line.

In the operations described it has been found preferable to orient the cords, wires, or such reinforcing elements of the breaker belt stock upward and toward the left, as seen in FIG. 1, so as to place the acute angle X with its vertex forward in the direction of travel of the stock and of the surface 24.

The term, breaker-belt, as used in the present specification and claims will be understood to mean cord, wire, or like reinforced tire ply material of any well-known type commonly used in making tires to provide reinforcement beneath the tread and generally of a width, when folded, less than the section width of such tires as commonly understood.

The term, running length, as used in the present specification and claims will be understood to mean an indefinite running length of stock as distinguished from a particular precut length as well as from a length of such stock made endless by joining opposite and previously open ends of such precut length.

The terms, longitudinal and lateral, as used in the present specification and claims will be understood to have their commonly understood meaning with reference to the running length as defined and to the width of the stock normal to such running length.

While certain representative embodiments and details have been shown for the purpose of illustrating the invention, it will be apparent to those skilled in the art that various changes and modifications may be made therein without departing from the spirit or scope of the invention.

What is claimed is:

1. The method of folding tire cord or wire ply stock continuously about a predetermined fold line extending longitudinally of a running length of such stock to supply folded belt stock for later use in making tires comprising, continuously engaging said stock with an arcuate portion of a cylindrical surface having an axis and an arcuate edge lying in a plane normal to said axis such that said fold line lies parallel and close to said plane and a first portion of the width of said stock at one side of said fold line is disposed in non-slip contact with and on said surface and the remaining portion of the width of said stock is disposed off said surface beyond said edge, rotating said cylindrical surface and said stock about said axis while supplying said stock in its unfolded state continuously to said surface as said surface moves through a first position thereof and removing said stock in its folded state as said surface moves through a second position thereof remote from said first position, and between said first and said second positions displacing said remaining portion of the width of said stock progressively angularly about said fold line first outwardly relative of said axis and then inwardly toward said surface to engage respective portions of the width of said stock in direct face-to-face contact from said fold line to form said belt.

2. The method of claim 1, including pressing the respective portions together before removing said belt from said surface.

3. The method of claim 1, including engaging said stock and said surface such that said cords or wires extend forwardly across said fold line in the direction of movement of said surface and outwardly of said edge in said remaining portion of the width of said stock.

4. An apparatus for folding breaker belt stock for later use in building tires comprising:
   a cylindrical stock support surface engageable with a running length of such stock extending between a supply thereof and a take-up therefor,
   said surface having an arcuate edge extending parallel to said length and to a desired fold line and being movable in a direction parallel to said fold line,
   a plurality of stock folding devices disposed at intervals along said edge, each said device comprising a plurality of rollers each mounted for rotation about an axis lying in a plane normal to both said surface and the direction of movement thereof.

5. The apparatus of claim 4, wherein said surface is provided by a cylindrical drum, and said edge lies in a plane perpendicular to the rotation axis of said drum, said stock being engageable with less than the full circumferential extent of said drum.

6. The apparatus of claim 4, wherein said folding devices each comprise a plurality of narrow face rollers each rotatable independently of the others about a common axis.

7. The apparatus of claim 4, wherein the axes of said folding devices each makes a lesser angle with said surface than the angle of the axis of the next preceding folding device with said surface.

8. The apparatus of claim 4, including guide means adjustably positioned on said surface parallel to said edge.

9. The apparatus of claim 4, wherein said surface is provided by a cylindrical rotatable drum, and comprising drive means for rotating said drum with said stock in substantially non-slipping engagement thereon, a guide ring carried coaxially on said drum and axially adjustably thereon to locate an edge of such stock, said folding devices each comprising a plurality of narrow face rollers rotatable independently and coaxially of the respective device, said rollers being located adjacent said longitudinal edge at about equal arcuate intervals about said drum, successive ones of said turning device axes being oriented at successively decreasing angles with respect to the surface of said drum, and at least one of said devices being urged resiliently toward the surface of said drum.

10. The apparatus of claim 9, further comprising a fulcrum wheel mounted for rotation in a plane approximately bisecting the angle formed by the respectively opposing portions of a belt being folded and engageable in rolling contact with such belt along its fold line.

* * * * *

UNITED STATES PATENT OFFICE
CERTIFICATE OF CORRECTION

PATENT NO. : 3,897,943
DATED : August 5, 1975
INVENTOR(S) : William J. Head and Georges Goedert It is certified that error appears in the above—identified patent and that said Letters Patent are hereby corrected as shown below:

Column 2, line 45, "station 2" should be -- station 3 --

Signed and Sealed this twenty-third Day of December 1975

[SEAL]

Attest:

RUTH C. MASON
Attesting Officer

C. MARSHALL DANN
Commissioner of Patents and Trademarks